March 2, 1965     W. C. BROEKHUYSEN     3,171,923
VIBRATION SUPPRESSION
Filed Sept. 20, 1961
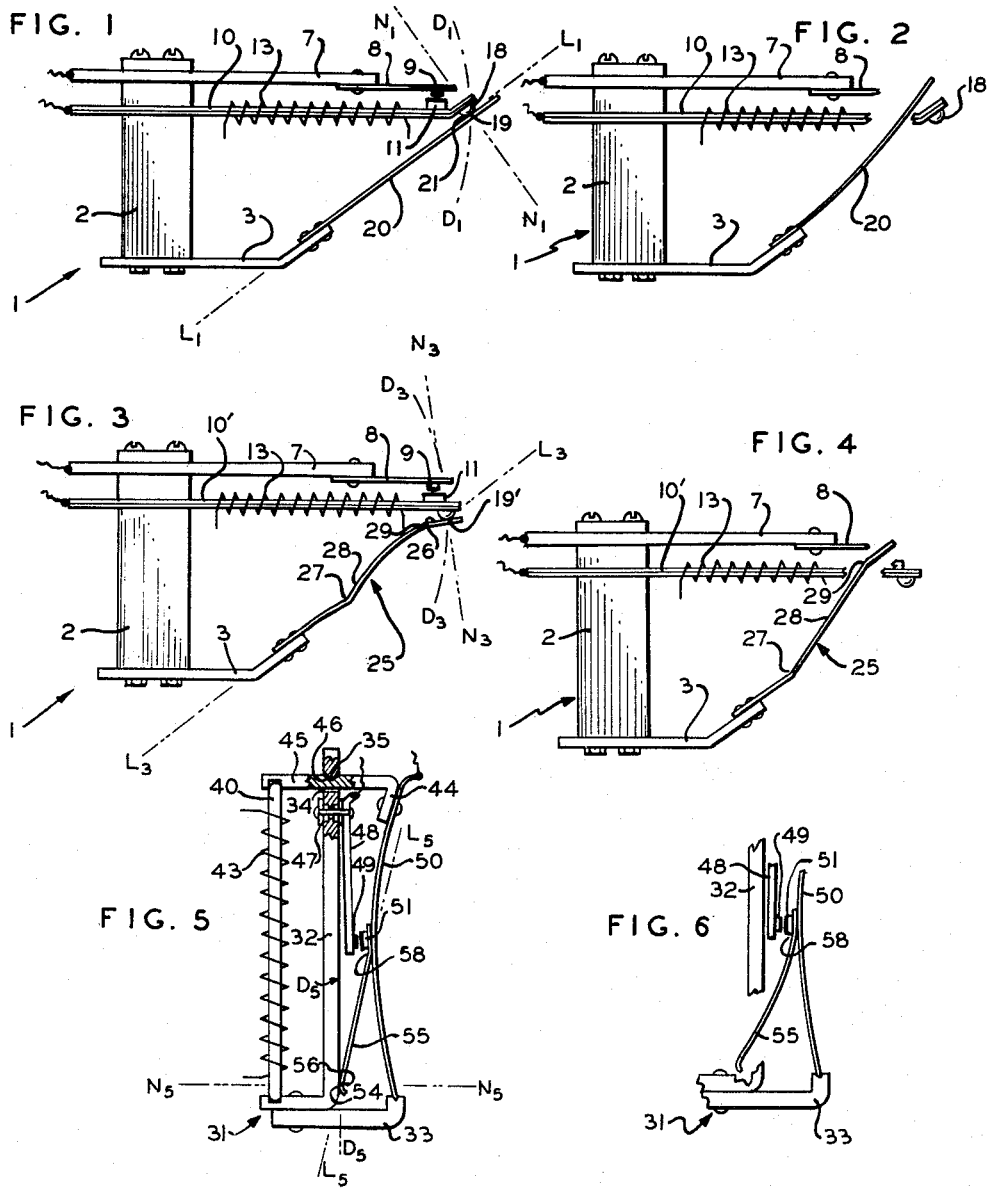
INVENTOR.
WILLIAM C. BROEKHUYSEN
BY
ATTORNEY United States Patent Office 3,171,923
Patented Mar. 2, 1965

3,171,923
VIBRATION SUPPRESSION
William C. Broekhuysen, New York, N.Y., assignor to G-V Controls Inc., Livingston, N.J., a corporation of New Jersey
Filed Sept. 20, 1961, Ser. No. 139,523
10 Claims. (Cl. 200—122)

This invention relates to vibration suppression, and more particularly to the suppression of unwanted transverse vibration of a beam whose intended function is sustained (i.e., non-oscillatory) transverse deflection but which is exposed to external vibratory forces. While in broader aspects of the invention the deflectible beam may be one serving any of a variety of purposes, the invention particularly contemplates that beam being the deflectible member of an electrical control device, such as a relay, thermostat or the like.

With a deflectible beam, and specifically in the relay art, there is known the use of a restraining surface biased against the beam and so supported that the beam, in its attempted response to external vibratory forces, engages in vibratory frictional contact with the restraining surface. At higher amplitudes of the vibratory forces the vibratory frictional contact between beam and restraining surface does take place, and there is achieved an energy dissipation which limits, though it does not foreclose, vibrational response of the beam to the vibratory forces. As the external vibratory force is reduced, however, a threshold amplitude is reached at which the vibratory frictional contact is replaced by static frictional contact—i.e., the restraining surface no longer slips vibratorily along the beam. This threshold is typically so high that below it there is left an important range of vibratory-force amplitudes, especially in the case of higher-frequency vibratory forces, whose amplitudes usually tend inherently to be small. Indeed, many purposes require an essential freedom of the beam from any significant vibration at all, and for such purposes the force range below this threshold may be the only range of real interest. Unfortunately the known arrangements of the type mentioned above do little, and sometimes nothing, to suppress vibration of the beam in this range.

It is an object of my invention to suppress the vibratory response of a deflectible beam to external vibratory forces. It is an object to suppress such response particularly to such forces of lower amplitudes, and to those of higher frequencies. It is an object to suppress such response in the lower-amplitude range, in distinction to reducing it by damping (although the structure used for the purpose may also operate in the latter manner at force amplitudes above that range). It is an object to provide simple and dependable means for accomplishing such suppression.

It is an object to provide an improved electrical control device adapted for satisfactory operation in a vibratory environment.

From another point of view it may be shown that, in the range of external-vibratory-force amplitudes below the threshold mentioned above, the overall structure comprising the beam together with the restraining surface and the means which carries the latter in the known arrangements mentioned above is characterized by a relatively low main resonant frequency. It is an object of my invention to raise this resonant frequency very substantially.

Allied and other objects will appear from the following description and the appended claims.

I have discovered that the cause of the ineffectiveness of the known arrangements mentioned above in the subthreshold range is the oscillatory yielding of the means which carries the restraining surface. For example, to the base or support from which a beam extends there may be attached at a distance from the beam an initially flat leaf spring which extends diagonally toward the beam and at its free end carries the restraining surface and biases it against the beam; in performing its biasing function the spring will be bowed between its point of attachment and the restraining surface. Below the threshold— i.e., when the restraining surface no longer vibratorily slips along and frictionally damps the beam—the leaf spring will oscillatorily increase and decrease its degree of bow, thus oscillatorily yielding to instead of suppressing the vibration of the beam.

According to my invention the restraining-surface-carrying means, though of course compliant in the direction of biasing, is made substantially rigid in another appropriate direction—e.g., along the line between its point of attachment and the restraining surface—so that such oscillatory yielding as is mentioned above is precluded. If for example a leaf spring be used it is, in its unloaded condition, suitably preformed away from a flat state so that its configuration will approximate a flat one while it is biasing the restraining surface. The result is a substantial foreclosure of any beam vibration at all, within the sub-threshold range, up to a very high frequency— this being the main resonant frequency of the overall structure as mentioned above, and being itself greatly raised above that characterizing the corresponding known arrangement. Variations of this particular example, which however also involve the substantial rigidity in an appropriate direction, are also comprised within my invention and are illustratively described hereinafter.

In the detailed description of my invention hereinafter set forth reference is made to the accompanying drawing, in which:

FIGURE 1 is an elevational view of an electrical control device, which may be either a thermal relay or a thermostat, embodying my invention in one form, in which the deflectible beam is a bimetallic strip and the restraining surface, carried by a spring attached to the structure which supports the beam, is biased into frictional contact with a surface on the beam;

FIGURE 2 is a view of the device of FIGURE 1 with a portion of the beam (and a portion of a cooperating element) broken away to show the configuration and position which the spring tends to assume in the absence of the contact of the surfaces with each other;

FIGURE 3 is an elevational view of a device generally similar to that of FIGURE 1 but with a modified form of spring according to my invention;

FIGURE 4 is a view of the device of FIGURE 3 with portions broken away (as in the case of FIGURE 2) to show the configuration and position which the modified spring tends to assume in the absence of the contact of the surfaces with each other;

FIGURE 5 is an elevational view of a thermal relay embodying my invention in another form, in which the deflectible beam is a bowed strip and the restraining surface, carried by a spring attached to the beam, is biased into frictional contact with a surface on the structure which supports the beam; and FIGURE 6 is a view of the relay of FIGURE 5 with portions broken away to show the configuration and position which the spring of that figure tends to assume in the absence of the contact of the surfaces with each other.

A general class of beam with which my invention may be employed is one of which the deflection is effected by bending distributed along the length of the beam, one type of this class being for example a fixed-free (i.e., cantilever) beam, and another being for example a fixed-fixed beam (i.e., one bowed by appropriate establishment of the relationship between its length and the separation of members between which it is constrained). The device illustrated in FIGURE 1 employs a beam of the first of these types; it is a bimetallic strip 10 of which a portion near the left-shown end is clamped in an insulating stack 2 which in turn forms part of a supporting structure 1. For relay use there may be wound around the beam 10 a winding 13 to which heating current may be supplied, the effect of such supply being of course to heat the beam and thereby to cause its deflection, which is assumed upward in FIGURE 1; for simple thermostatic use the heater winding 13 may be omitted, it then being a rise of ambient temperature which will cause the upward deflection of the beam 10.

Spacedly above the beam 10 there is provided a metallic bar 7 of which a portion near the left-shown end may be clamped in the stack 2; this may extend in the right-shown direction for a distance for example somewhat less than the extent of the beam 10, and to it near its right-shown extremity there may be secured a leaf spring 8 which in turn extends on to about that full extent. Near their free extremities the beam 10 and the spring 8 may carry contacts, 11 and 9 respectively, which face each other and are slightly spaced apart under conditions of normal temperature.

It will of course be understood that at an appropriate interval after the initiation of application of heat to the beam 10, whether by way of supply of current to winding 13 or as a result of a rise in ambient temperature, the beam 10 will have been deflected upwardly sufficiently to close contact 11 against contact 9, thereby operating the device. The structure as thus described will be recognized as quite conventional and, when used as a relay, as wholly amenable to compensation when desired against the effects thereon of ambient temperature by expedients which, being themselves well known, do not need to be shown herein.

When the device is used in a vibratory environment the beam 10 may respond to the forces imposed on it by that environment, and engage in vibration which among other things will cause premature operation (e.g., closure) of the contacts, for example in an intermittent fashion. It is to substantially totally suppress such vibratory response to such forces of modest and low amplitude that my invention is especially directed.

In accordance with known arrangements I provide a restraining surface biased into frictional contact with a surface on the beam. In FIGURE 1 such a restraining surface may be a region 21 on the top of a spring 20 which is attached to and for example extends diagonally rightwardly and upwardly from a bracket 3 clamped to the stack 2 and forming part of the supporting structure 1, it being the spring 20 which biases the surface 21. The surface on the beam against which the restraining surface 21 is biased may for example be the apex 19 of a small projection 18 formed on or secured to the bottom of that beam closely adjacent its right-shown end, that very end portion of the beam being conveniently bent diagonally upwardly into approximate parallelism with the general course of the spring 20.

The general arrangement as so far described approximates known arrangements. Larger deflections of the beam 10, such as those engaged in by the beam in response to the sustained (i.e., non-oscillatory) force generated by its heating, will cause the beam surface 19 to slip or slide along the surface 21; likewise high amplitudes of vibratory force will cause a vibratory sliding of 19 along 21, the sliding friction thus effected serving to damp and thus to reduce the amplitude of the vibration of the beam—this being the action for which such structures have previously been designed. At lower amplitudes of vibratory force, however, the sliding friction is replaced by static friction, and the damping action disappears; whether or not the response of the beam to the vibratory force is effectively suppressed depends now on characteristics of the means which carries the restraining surface—e.g., of the spring 20 in the case of FIGURE 1. It is with those means that my invention is especially concerned.

According to my invention as embodied in the structure of FIGURE 1, I cause the means which carries the restraining surface to be compliant with respect to force exerted on the restraining surface at the point of frictional contact along the normal to the surfaces at that point, but to form between the restraining surface and the supporting structure (to which both beam and carrying means are attached) a connection essentially rigid along a line through that point which is inclined from said normal by an angle greater than the angle of static friction characterizing the surfaces. If these specifications be observed and deflectibility of the beam is on the one hand preserved as to sustained forces (and as to vibratory forces of amplitude great enough to cause vibratory sliding friction between the surfaces) but is on the other hand effectively suppressed as to smaller vibratory forces.

Stated in other terms, in the range of smaller vibratory forces the beam in effect changes from a simple end-supported beam whose vibration has at higher amplitudes been restrained only to the extent of a reduction effected by the damping attendant on sliding friction, to one reinforced by the carrying means 20 acting as a strut disposed in a direction having at least a component coinciding with the direction of attempted vibration of the beam, and effectively tied to the beam through the now-static frictional contact between the surfaces 19 and 21. The increase in effective stiffness of the beam contributed by the strut is tremendous, and the increase in its resonant frequency is very large. Furthermore any possible tendency toward vibratory response of the now-strutted beam within its length is made virtually meaningless in terms of contact motion by the close proximity of the contact 11 to the surface 19.

The most usually convenient way in which to carry out the specifications laid down above is to arrange the carrying means to be rigid along the line between its point of attachment to the supporting structure and the point of frictional contact of the surfaces, that line then being the one which has been referred to in the specifications. Thus in the FIGURE 1 structure the cantilever spring 20 extends in substantially straight configuration and closely along the line between its point of attachment and the point of the frictional contact when the restraining surface 21 is in the frictional contact—i.e., when the spring 20 is in its loaded condition. In order that it may have such a configuration and disposition while it is biasing the surface 21 against the surface 19—i.e., while it is in its loaded condition—it is in its unloaded condition substantially curved. This has been illustrated in FIGURE 2, wherein the structure of FIGURE 1 has been reillustrated with portions of the beam 10 and of the contact-carrying spring 8 broken away (these elements still being fractionally shown, rather than omitted altogether, for better illustration of the typical relationships).

In order that the spring 20 need not have a special configuration adjacent its point of attachment to the supporting structure, the bracket 3 (forming a part of that structure) may have its right-shown end portion bent to lie along the line referred to in the specification above.

The general unloaded configuration of the spring 20—which typically calls for displacements from the above-mentioned line of about 8%, 31% and 63% of its displacement at the surface 21 at one-quarter, one-half and three-quarters respectively of the distance between its point of attachment and the surface 21—may, at least with certain spring materials, be difficult to achieve in a "one-form" operation without so great a degree of curvature as to overbias the surface 21 against the surface 19; this results from the need, in forming the spring, to exceed the elastic limit of the spring material. A way of coping with this difficulty is first to form the spring with a curvature reverse to its final one and of degree sufficient so that the elastic limit is dependably exceeded, and then from that state to reform it into final curvature.

I have found another manner of handling the problem of spring formation, at a theoretical slight disadvantage which in practice is of negligible magnitude. In this alternative manner of formation there are made in the initially flat spring material one or more relatively sharply localized angular bends only, so disposed that on the abovementioned line (between the point of spring attachment to the supporting structure and the point of contact of the two surfaces) there lies an intermediate point on the spring appreciably removed both from that attachment point and from the restraining surface. This alternative manner is illustrated in FIGURES 3 and 4.

In these figures all parts other than the spring may for example be as in FIGURES 1 and 2, excepting that if desired there may be omitted the bending of the very end portion of the beam; the beam is accordingly designated as 10′ and the apex of the small projection therefrom as 19′. At a distance from the point of spring attachment (which may approximately be taken as the extremity of the bracket 3) for example of about one-quarter of the separation of the restraining surface from that point there may be formed in the spring (now designated as 25) a discrete and relatively sharply localized bend 27, of an angle typically of the order of 20° deviation from straightness and in the direction which in the assembled device will cause a bias of the restraining surface (now designated as 26) against the beam surface 19′. Assuming the bending of the very end portion of the beam has been omitted, it is desirable to provide in the spring another bend 29, reverse in direction to the first and of about 25° deviation from straightness near its free end in order appropriately to reorient the restraining surface 26.

The configuration of the unloaded spring is indicated in FIGURE 4. When the spring is assembled in the completed device, as shown in FIGURE 3, a point 28 along the spring whose separations from the point of spring attachment and from the restraining surface are in such a ratio as about 3:5 will lie on the line between the attachment point and the restraining surface. The spring, while now digressing limitedly from the line, is now made up of a series of sections of alternately directed digressions; both theory and experiment show that it has a stiffness along the line many times that characterizing a spring having one singly directed digression and it therefore provides an essentially, even if not infinitely, rigid element as seen along the line.

In practical operation the structure of FIGURES 3 and 4 functions with negligible impairment of the perfection with which that of FIGURES 1 and 2 operates.

In review of the two structures, it will of course be observed that the normal to the frictionally contacting surfaces in FIGURE 1 is the normal $N_1$—$N_1$, while in FIGURE 3 it is the normal $N_3$—$N_3$. The line of essential rigidity in FIGURE 1 is the line $L_1$—$L_1$, while in FIGURE 3 it is the line $L_3$—$L_3$. The locus of movement of the beam surface attendant on beam deflection in FIGURE 1 is the deflective locus $D_1$—$D_1$, while in FIGURE 3 it is the deflective locus $D_3$—$D_3$. Clearly the means which carries the restraining surface (spring 20 or spring 25) is compliant along the normal $N_1$—$N_1$ or $N_3$—$N_3$. Equally clearly the line of essential rigidity of that means—i.e., line $L_1$—$L_1$ or line $L_3$—$L_3$—passes through the frictional contact point and is inclined from the normal $N_1$—$N_1$ or $N_3$—$N_3$ by an angle greater than the angle of static friction characterizing the contacting surfaces, since with the ordinarily smooth metallic surfaces which are contemplated that angle would typically be much less than 90°. It will also be observed that in both FIGURES 1–2 and 3–4 the direction of deflection of the beam is vertical, while the normal to the frictionally contacting surfaces ($N_1$—$N_1$ or $N_3$—$N_3$) deviates from that direction by substantially less than half, or by a distinctly minor portion only, of a right angle—indeed, in FIGURES 3–4 by a mere few degrees. This implicitly means that when the beam is intendedly in process of deflecting the force-reaction of sliding friction between the surfaces effects only a small, and typically an altogether negligible, subtraction from the force deliberately applied to achieve the intended deflection.

In each of these structures the restraining surface is shown as flat while the beam surface is shown as convexly curved. It is indeed desirable that at least one of the surfaces be convexly curved, first in order that the inter-surface friction shall be substantially the same for relative movement in either direction, and secondly in order that the pressure between surfaces be concentrated in a very small area—favoring a high ratio of static to sliding friction and thus a maximum suppression of vibration with minimum restraint on sustained deflection. It is however quite unnecessary that, when only one is curved, the carrying means be chosen as the element with which the flat surface will be uniquely associated, such association having been shown by way of convenient example only.

The adaptability of my invention to a fixed-fixed type of beam, mentioned above, is illustrated in FIGURES 5 and 6. These figures also illustrate a reversibility which is available—i.e., the restraining surface may if desired be carried by means attached to and extending from the beam and may then be biased into contact with a surface on the supporting structure.

In these figures the supporting structure, designated in its entirety as 31, may comprise a rigid L-shaped bracket 32 (of which the bottom or short horizontal leg is shown extending to the left rather than to the right) to the bottom of which is secured a horizontal rigid arm 33 extending for a distance to the right. Near the top of the bracket 32 it may be provided with a rectangular aperture 34 (adjacent which the parts are shown in FIGURE 5 in section) of which the upper surface 35 may be V-shaped in cross section; a lever 45 may pass through this aperture and, at a suitable more widely V-shaped notch 46 provided in its top, pivot limitedly about the downwardly directed apex of the surface 35. Between the lefthand end portions of the lever 45 and of the horizontal leg of the bracket 32 there may extend vertically a straight bar 40, and about this bar may be wound a winding 43 to which heating current may be supplied. At its righthand end the lever 45 may be provided with a short extension 44 hanging downwardly for example at a somewhat acute angle, and to this extension may be secured the upper end of a relatively thin beam 50 of which the lower end may be retained in the suitably notched and upturned end of the arm 33. By suitable choice of the dimensions the beam 50 is compressively constrained between the lever 45 and the arm 33 and is thereby caused to bow toward the bracket 32 (and the lever is maintained in its pivoted position above described).

It will be understood that upon the supply of heating current to the winding 43 there will be initiated a heating and a consequent elongation of the bar 40; this elongation will progressively rock the lever 45 in a clockwise direction as illustrated, shortening the separation between the members (45 and 33) between which the beam 50 is constrained and increasing the degree of bowing of that beam. A contact 51 may be carried by the beam 50 at its center, facing toward the bracket 32. Through a suitable insulating arrangement 47 there may be secured to the bracket 32, for example just below the aperture 34, the upper portion of a leaf spring 48 which extends downwardly slightly to the right of the bracket 32 to just past the contact 51, and opposite the latter the leaf spring 48 may carry a contact 49 facing the contact 51. At the expiration of a sufficient interval of supply of heating current to the winding 43 the contact 51 will be closed against contact 49, thereby operating the device of these FIGURES 5 and 6.

In these figures the means which carries the restraining surface may be a spring 55 attached to and extending from the beam 50, preferably adjacent its point of maximum deflection, or center; it may for example be first secured to that beam and thereafter the contact 51 secured to it. From its point of attachment the spring 55 may extend principally downwardly but at the same time somewhat leftwardly, and close to its free extremity it may be curved fairly sharply rightwardly to form a rounded convex surface which where it has a vertical tangent will be the restraining surface 56; this restraining surface is biased through the spring into frictional contact with the supporting structure, specifically with the righthand surface 54 of the vertical leg of the bracket 32 slightly above the horizontal arm 33.

The specifications laid down above in connection with the description of FIGURES 1 and 2 were stated on the basis that the restraining surface was adapted to be biased into frictional contact with a surface on the beam and was carried by means attached to and extending from the supporting structure. On the other hand in the structure of FIGURES 5 and 6 the restraining means is adapted to be biased into frictional contact with a surface on the supporting structure and is carried by means attached to and extending from the beam. More generically stated specifications are called for. These may be stated in terms of two members which respectively are a deflectible beam and a support therefor; in terms of a restraining surface adapted for frictional contact with a surface on one of the members; and in terms of carrying means, attached to and extending from the other of the members, on which the restraining surface is fixed, whereby one of the surfaces (e.g. in FIGURE 1, 19) is associated with the beam independently of, but the other surface (e.g. in FIGURE 1, 21) is associated with the beam through the frictional contact.

In these terms the specifications may be restated as follows: That the means which carries the restraining surface be compliant with respect to force exerted on the restraining surface at the point of the frictional contact along the normal to the surfaces at that point, but that it form between the restraining surface and the member to which it is attached a connection essentially rigid along a line which passes through said point and is inclined from said normal by an angle greater than the angle of static friction characterizing the surfaces. It remains usually most convenient that this line be the line between the point of attachment of the carrying means and the frictional-contact point.

While for the spring 55 of FIGURES 5 and 6 between its point of attachment and the restraining surface 56 there may be used the principles of spring configuration either of FIGURES 1 and 2 or of FIGURES 3 and 4, the former have been illustrated by way of example. Thus between those points the spring 55 will be of essentially straight configuration when loaded, as illustrated in FIGURE 5. For this purpose it will have an initial slight bend 58 immediately adjacent its point of attachment to the beam 50; beyond that and to the rounding which provides the restraining surface 56 the spring in its unloaded condition will have the smooth curvature illustrated in FIGURE 6.

The normal, the line of essential rigidity, and the locus of movement of the restraining surface attendant on beam deflection are respectively indicated in FIGURE 5 by $N_5$—$N_5$, $L_5$—$L_5$ and $D_5$—$D_5$. The spring 55 is of course compliant with respect to force exerted along $N_5$—$N_5$, and it is essentially rigid along $L_5$—$L_5$—a line which passes through the contact point and is inclined from $N_5$—$N_5$ by an angle necessarily greater than the modest angle of static friction characterizing the surfaces 54 and 56. It will also be observed that, as in the case of FIGURES 3–4, the normal to the frictionally contacting surfaces (now $N_5$—$N_5$) deviates negligibly from the direction (now essentially horizontal) of deflectibility of the beam itself. Thus the generic specifications are met by the structure of FIGURES 5 and 6 equally as well as by those of earlier figures—and in respect of suppression of vibratory response of the beam to lower-amplitude external vibratory forces the structure produces similar results, subject of course to the differences inherently arising from the considerably varied basic organization and from the attachment to the beam of the additional mass involved in the spring 55.

While in any of the embodiments of my invention the materials and finish characteristics of the two surfaces which are in frictional contact with each other may be varied in some degree to establish desired frictional characteristics, I have in general preferred to employ metals of an ordinary, though not exceptional, surface smoothness. In connection with these surfaces it will be appreciated that it is the joint action of the two rather than the action of either one, which accomplishes the desired result, and that the use of the term "restraining" in modification of one is simply a convenience in identifying that one which is provided on the carrying means (rather than on the beam or supporting structure itself).

It will be understood that any of the embodiments of my invention is most useful in the case wherein the maximum vibratory force exerted by the environment on the beam in the direction of its principal deflectibility is appreciably less than the sustained force which will be applied to the beam in the normal operation of the device of that embodiment. This affords the opportunity so to establish the friction between the surfaces as to exert on the beam in that direction a restraining force greater than the vibratory forces and at the same time less than the sustained deflecting force, and such a magnitude of friction is the preferred one.

While I have disclosed my invention in terms of particular embodiments thereof, it will be understood that I thereby intend no unnecessary limitations. Modifications in many respects will be suggested by my disclosure to those skilled in the art, and such modifications will not necessarily constitute departures from the spirit of the invention or from its scope, which I undertake to define in the following claims.

I claim:

1. In an electrical control device comprising a transversely deflectible beam and a support therefor: the combination of a restraining surface having frictional contact with a surface on said beam, and carrying means, attached to and extending from said support, on which said restraining surface is fixed and through which it is biased into said frictional contact, the line from the point of said contact to the point of said attachment being inclined from the normal to said surfaces by an angle greater than the angle of static friction characterizing those surfaces, said normal having a maximum angular deviation from the direction of deflectibility of the beam of a minor portion of a right angle, and said carrying means being compliant with respect to force exerted at the point of said contact along said normal but being essentially rigid with respect to force exerted at said contact point along said line.

2. The subject matter claimed in claim 1, wherein said carrying means comprises a cantilever spring in which, between said point of attachment and said restraining surface, there are discrete oblique bends and between said bends a point lying on said line.

3. The subject matter claimed in claim 1, wherein said carrying means comprises a cantilever spring which, throughout at least the major portion of the distance between the point of said attachment and said restraining surface, extends in substantially straight configuration and closely along said line when said restraining surface is in said frictional contact but in its unloaded condition extends in substantially curved configuration.

4. In an electrical control device comprising a transversely deflectible beam and a support therefor: the combination of a restraining surface having frictional contact with a surface on said beam, and carrying means, attached to and extending from said support, on which said restraining surface is fixed and through which it is biased into said frictional contact, said carrying means being compliant with respect to force exerted at the point of said frictional contact along the normal to said surfaces but forming between said restraining surface and said support a connection essentially rigid with respect to force exerted at said point along a line which passes through said point and is inclined from said normal by an angle greater than the angle of static friction characterizing said surfaces, and said normal having a maximum angular deviation from the direction of deflectibility of the beam of a minor portion of a right angle.

5. In an electrical control device, for use in a vibratory environment, comprising a deflectible beam and a support therefor and further comprising means operable to exert on the beam in a transverse direction a sustained deflecting force greater than the vibratory deflecting forces to which the beam is subjected in that direction: the combination of a restraining surface having frictional contact with a surface on said beam, and carrying means, attached to and extending from said support, on which said restraining surface is fixed and through which it is biased into said frictional contact, said carrying means being compliant with respect to force exerted at the point of said frictional contact along the normal to said surfaces but forming between said restraining surface and said support a connection essentially rigid with respect to force exerted at said point along a line which passes through said point and is inclined from said normal by an angle greater than the angle of static friction characterizing said surfaces, said normal having a maximum angular deviation from the direction of deflectibility of the beam of a minor portion of a right angle, and said connection and frictional contact exerting on said beam in said transverse direction a restraining force greater than said vibratory forces but less than said first mentioned force.

6. In an electrical control device comprising two members which are respectively a deflectible beam and a support therefor: the combination of a restraining surface having frictional contact with a surface on one of said members, and carrying means, attached to and extending from the other of said members, on which said restraining surface is fixed and through which it is biased into said frictional contact, whereby one of said surfaces is associated with said beam independently of, but the other is associated with said beam through, said frictional contact, the line from the point of said contact to the point of said attachment being inclined from the normal to said surfaces by an angle greater than the angle of static friction characterizing said surfaces, said normal having a maximum angular deviation from the direction of deflectibility of the beam of a minor portion of a right angle, and said carrying means being compliant with respect to force exerted at the point of said contact along said normal but being essentially rigid with respect to force exerted at said contact point along said line.

7. The subject matter claimed in claim 6, wherein said carrying means comprises a cantilever spring in which, between said point of attachment and said restraining surface, there are discrete oblique bends and between said bends a point lying on said line.

8. The subject matter claimed in claim 6, wherein said carrying means comprises a cantilever spring which, throughout at least the major portion of the distance between the point of said attachment and said restraining surface, extends in substantially straight configuration and closely along said line when said restraining surface is in said frictional contact but in its unloaded condition extends in substantially curved configuration.

9. In an electrical control device comprising two members which are respectively a deflectible beam and a support therefor: the combination of a restraining surface having frictional contact with a surface on one of said members, and carrying means, attached to and extending from the other of said members, on which said restraining surface is fixed and through which it is biased into said frictional contact, whereby one of said surfaces is associated with said beam independently of, but the other is associated with said beam through, said frictional contact, said carrying means being compliant with respect to force exerted at the point of said frictional contact along the normal to said surfaces but forming between said restraining surface and said other member a connection essentially rigid with respect to force exerted at said point along a line which passes through said point and is inclined from said normal by an angle greater than the angle of static friction characterizing said surfaces, and said normal having a maximum angular deviation from the direction of deflectibility of the beam of a minor portion of a right angle.

10. In an electrical control device, for use in a vibratory environment, comprising two members which are respectively a deflectible beam and a support therefor and further comprising means operable to exert on the beam in a transverse direction a sustained deflecting force greater than the vibratory forces to which the beam is subjected in that direction: the combination of a restraining surface having frictional contact with a surface on one of said members, and carrying means, attached to and extending from the other of said members, on which said restraining means is fixed and through which it is biased into said frictional contact, whereby one of said surfaces is associated with said beam independently of, but the other is associated with said beam through, said frictional contact, said carrying means being compliant with respect to force exerted at the point of said frictional contact along the normal to said surfaces but forming between said restraining surface and said other member a connection essentially rigid with respect to force exerted at said point along a line which passes through said point and is inclined from said normal by an angle greater than the angle of static friction characterizing said surfaces, said normal having a maximum angular deviation from the direction of deflectibility of the beam of a minor portion of a right angle, and said connection and frictional contact exerting on said beam in said transverse direction a restraining force greater than said vibratory forces but less than said firstmentioned force, and said normal having a maximum angular deviation from the direction of deflectibility of the beam of a minor portion of a right angle.

References Cited in the file of this patent

UNITED STATES PATENTS 2,602,129     Valverde _____ July 1, 1952